Figure 1:
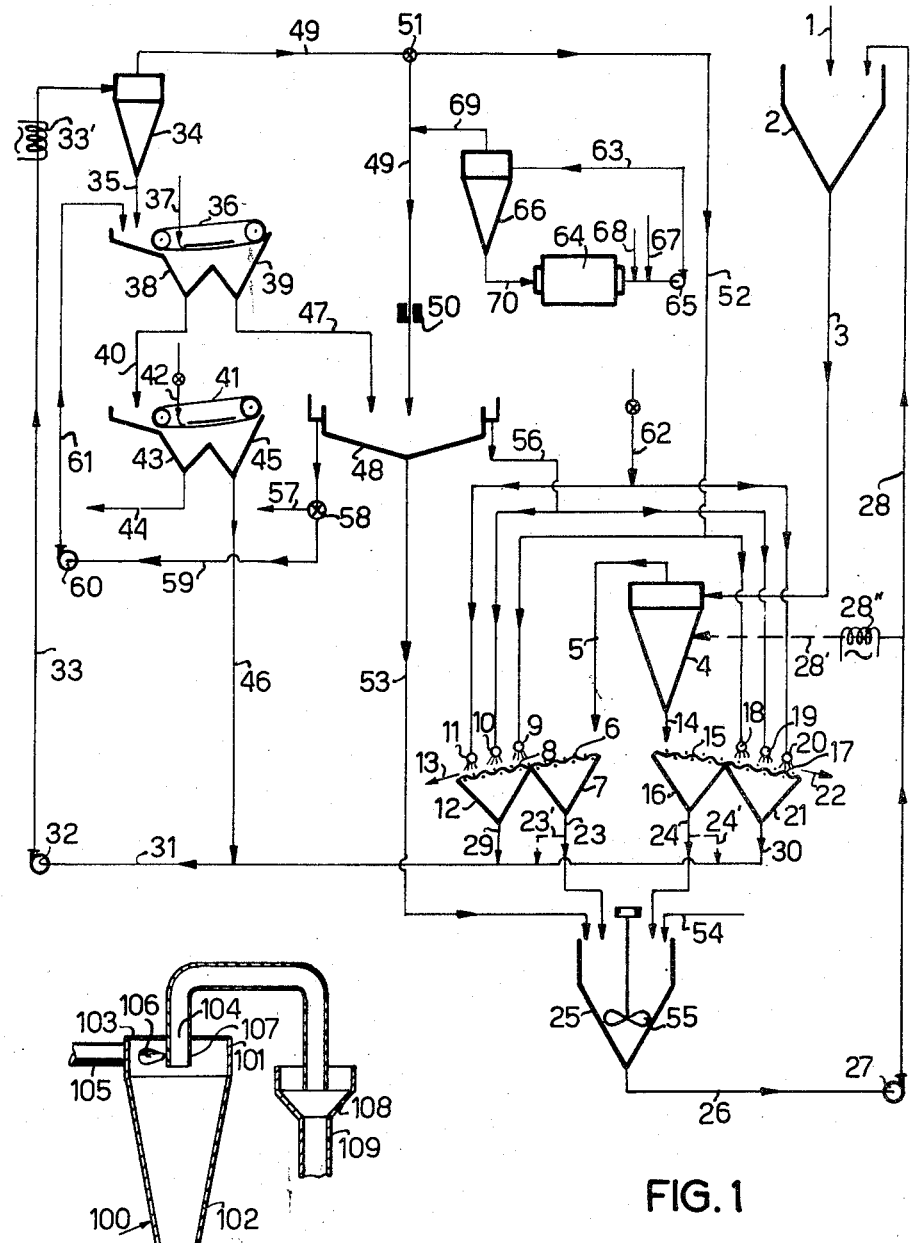

Feb. 19, 1957 F. J. FONTEIN 2,781,906
PROCESS AND APPARATUS FOR THE SEPARATION
OF MIXTURES OF SOLID PARTICLES
Filed May 27, 1954 4 Sheets-Sheet 1

Inventor
Freerk J. Fontein
By Cushman, Darby & Cushman
Attorneys

Feb. 19, 1957 F. J. FONTEIN 2,781,906
PROCESS AND APPARATUS FOR THE SEPARATION
OF MIXTURES OF SOLID PARTICLES
Filed May 27, 1954 4 Sheets-Sheet 3

Inventor
Freerk J. Fontein
By Cushman, Darby & Cushman
Attorneys

Feb. 19, 1957  F. J. FONTEIN  2,781,906
PROCESS AND APPARATUS FOR THE SEPARATION
OF MIXTURES OF SOLID PARTICLES
Filed May 27, 1954   4 Sheets-Sheet 4

United States Patent Office 2,781,906
Patented Feb. 19, 1957

2,781,906

PROCESS AND APPARATUS FOR THE SEPARATION OF MIXTURES OF SOLID PARTICLES

Freerk J. Fontein, Heerlen, Netherlands, assignor to Stamicarbon N. V., Heerlen, Netherlands Application May 27, 1954, Serial No. 432,771

Claims priority, application Netherlands July 4, 1951

27 Claims. (Cl. 209—172.5)

This invention relates to the separation of heterogeneous mixtures of solid particles having different densities. More particularly, the invention relates to a so-called "heavy media" separation process wherein use is made of a suspension of fine magnetic particles in a liquid, and also to apparatus to be used in such process. This application is a continuation-in-part of my prior application Serial No. 296,704, filed July 1, 1952, now abandoned.

In a heavy media separation process wherein use is made of a suspension of fine magnetic particles in a liquid the mixture of particles to be separated is mixed with a separating suspension of fine magnetic particles in a liquid. The resultant mass is then separated into at least two fractions, one fraction containing part of the separating suspension and the bulk of specifically heavier particles of the mixture and another fraction containing part of the separating suspension and the bulk of specifically lighter particles of the mixture.

This separation can be brought about in hydrocyclones of suitable size and under suitable operating conditions, in so-called "sink-and-float" separators such as wash troughs and also in other apparatus such as jigs. These separators and the way in which they are operated are well known and need not be discussed here. In all of them at least two fractions are obtained, each fraction consisting of a portion of the separating suspension and particles of the mixture.

These fractions are then screened, separating suspension and fine particles of the mixture passing through the screens and coarse particles of the mixture with adhering suspension remaining on the screens. The latter are then sprayed with liquid to remove adhering suspension. Thus one obtains a separated fraction of the mixture and diluted suspension containing also fine particles of the mixture, and often also undiluted suspension containing also fine particles of the mixture.

In general this undiluted suspension is directly returned to the separator, but it may be reconditioned or combined with the diluted suspension.

The diluted suspension is reconditioned, that is to say it is treated in such a manner that it can again be used in the separation process. This is necessary, as the price of the magnetic material and the price of the water or the amount of water available make reuse thereof indispensable. The invention relates in particular to the reconditioning of these diluted suspensions and it is the main object of this invention to provide an improved process and apparatus therefor.

As every fraction from the separator is sprayed on screens, a number of diluted suspension fractions are obtained, which either can be reconditioned separately or together.

In the process described thus far spraying liquid and fine particles of the mixture have been added to the separating suspension. (The fine particles may occur in the mixture to be separated or they may be due to breakage of coarser particles during separation and screening or transportation.) The reconditioning therefore amounts to removal of liquid and of fine particles of the mixture. A limited amount of fine particles may recirculate in the system, but in the long run the amount of fine particles removed during a given period of reconditioning should substantially be the same as the amount of fine particles introduced into the system during that period. Also the amount of liquid withdrawn during a given period of reconditioning should substantially be the same as the amount of spraying liquid and the amount of liquid contained in the mixture introduced into the system during that period. This withdrawn liquid or part thereof can then be used again for spraying.

Removal of particles of the mixture from the diluted suspension can easily be effected in magnetic separators, wherein the non-magnetic particles of the mixture are separated from the magnetic particles of the separating suspension; thickening of the diluted suspension can be effected efficiently in a gravity type continuous thickener. Both thickeners and magnetic separators are well known per se and need not be discussed here.

It will be clear that in actual operation the process described above is not perfect; no process is. Some specifically light particles will occur in the fraction of specifically heavy particles, some specifically heavy particles will occur in the fraction of specifically light particles. Both fractions will contain some magnetic particles. There also will occur loss of magnetic particles during the magnetic separation and during thickening. I now have found that the last mentioned losses can be reduced.

It therefore is an object of this invention to provide a process for reconditioning contaminated and diluted suspensions, obtained in heavy media separation processes wherein use is made of suspensions of magnetic particles in a liquid, in which process losses of magnetic particles are reduced to a minimum.

As the quantity of magnetic particles lost during magnetic separation depends on the quantity of magnetic particles fed into the magnetic separator, it is in particular an object of this invention to reduce the amount of magnetic particles fed into the magnetic separator, and in particular, to reduce the amount of very fine magnetic particles fed thereto. It is a further object to reduce the number of magnetic separators and the load thereon.

These and other objects are in general accomplished by classifying the contaminated and diluted suspension and feeding only the fraction of quickly settling particles obtained thereby to a magnetic separator. In this manner the bulk of magnetic particles, and in particular the bulk of the finest magnetic particles, by-passes the magnetic separator and consequently can not get lost therein.

The invention is more clearly and in more detail described in connection with the accompanying drawings, which show the fluid-flow circuit according to the invention, and several of the possible modifications of the flow-sheets are discussed in connection therewith.

Figure 2:
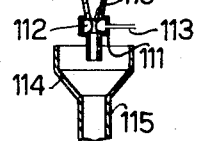
Figure 3:
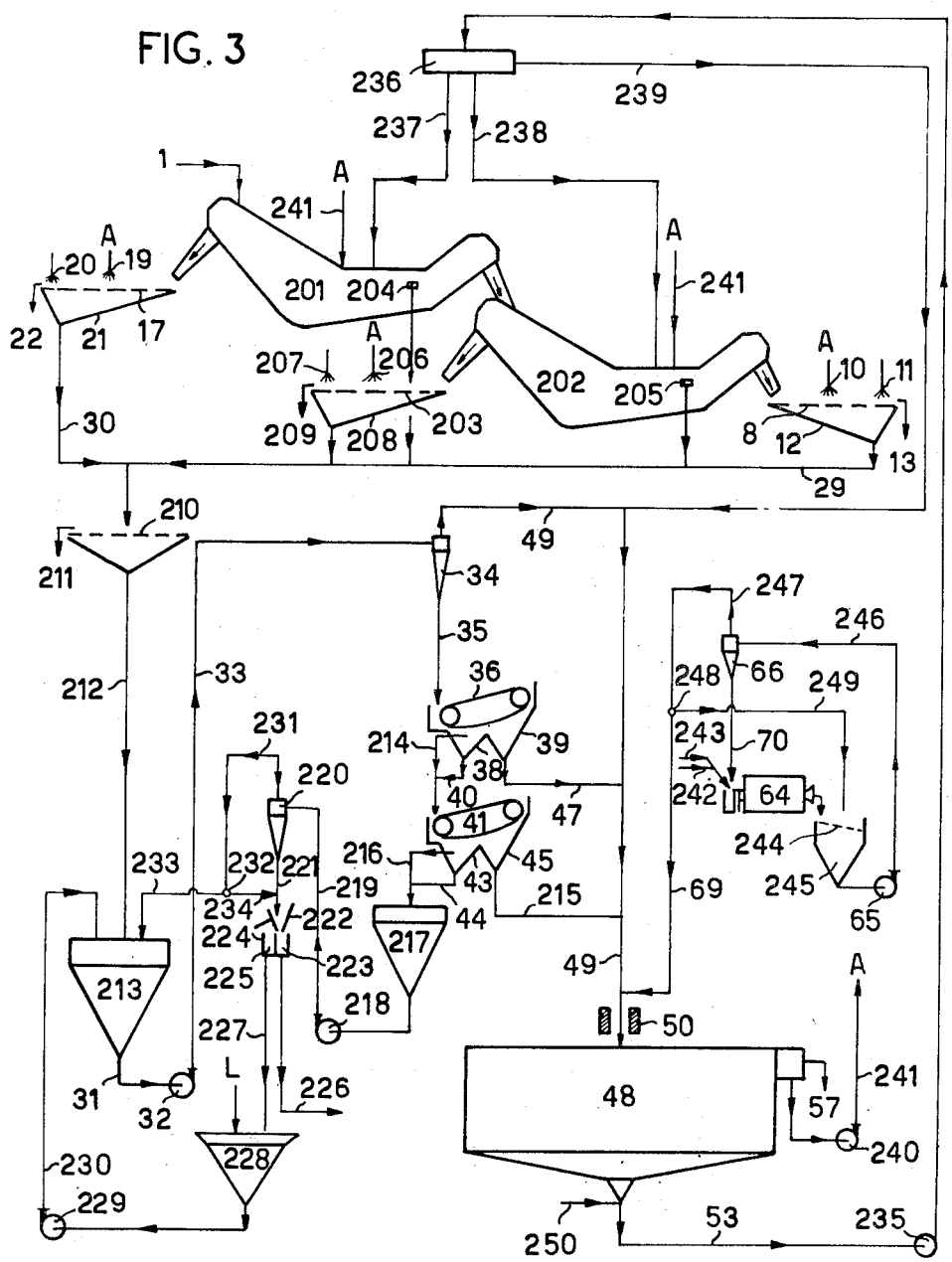
Figure 6:
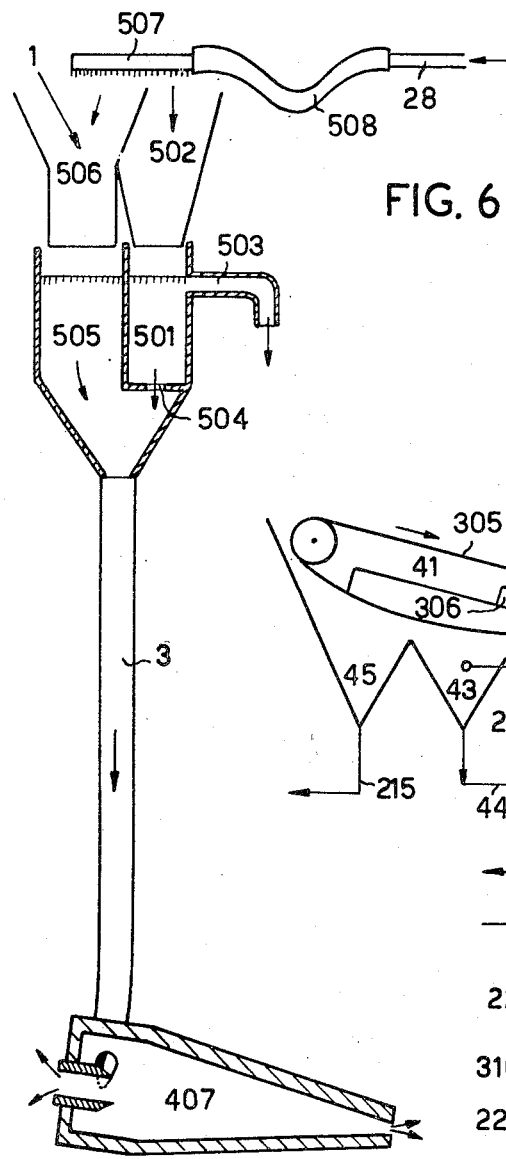
Figure 4:
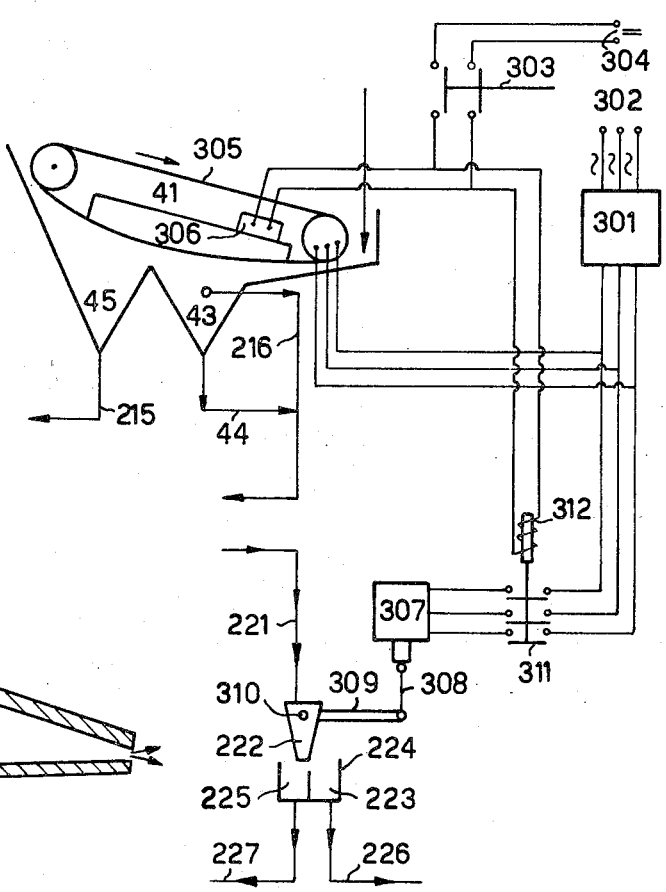
Figure 5:
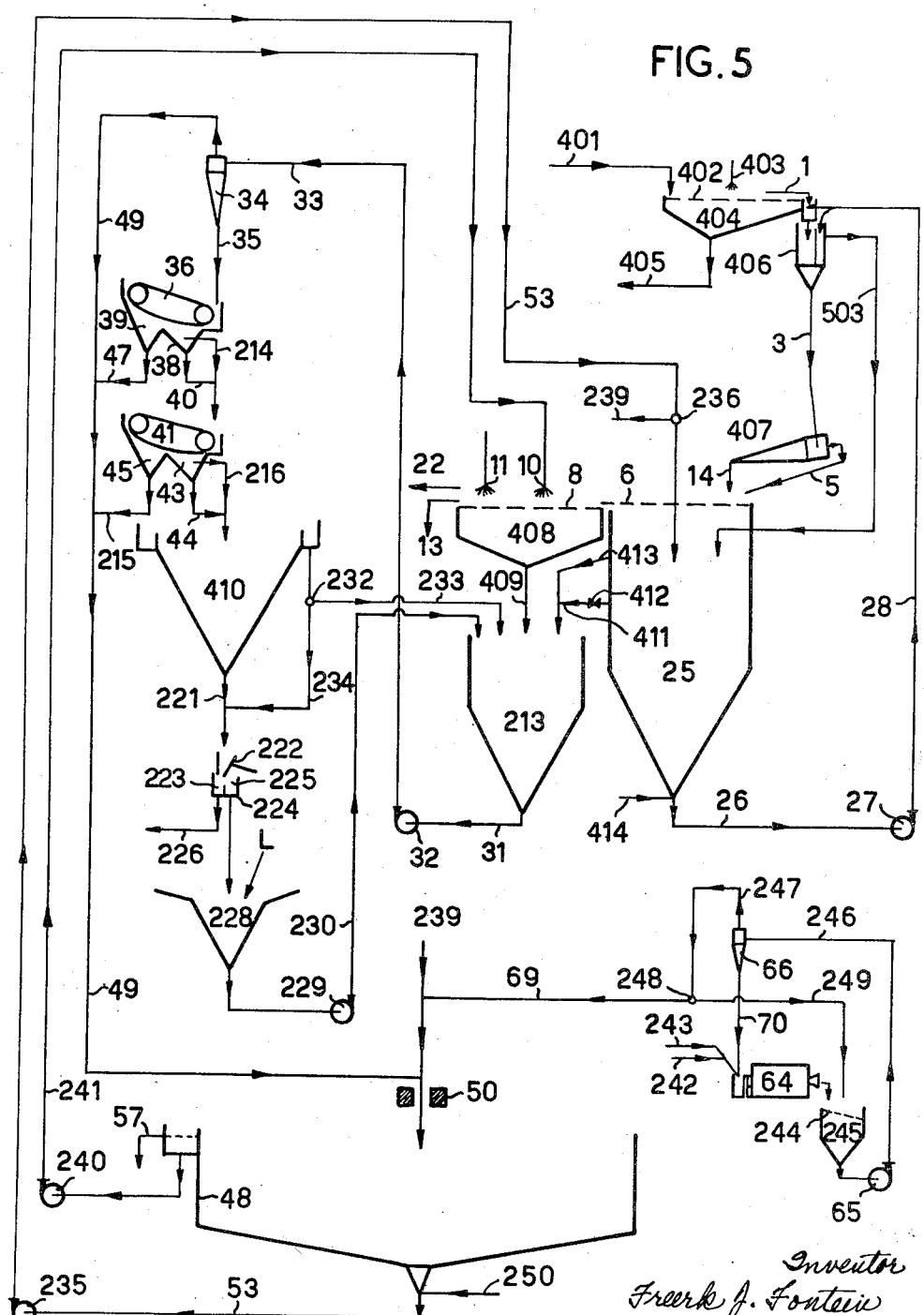

In the drawings Figure 1 represents a flow-sheet showing the main features of the invention; Figure 2 represents a hydrocyclone; Figures 3 and 5 represent flow-sheets showing embodiments of the invention in more detail; Figure 4 represents a safety device to be used in connection with a magnetic separator and Figure 6 represents a device for feeding a hydrocyclone or similar separating apparatus.

The material to be separated, for example deslimed raw coal fines, is supplied at 1 to a tank 2, from where it is fed through a conduit 3 into a specific gravity separator 4. This separator may be a tank, which is filled with a suspension of magnetite in water having a specific gravity intermediate the specific gravities of the coal and shale particles so that the coal floats and the shale particles sink in the liquid, or it may be a washing cyclone in which the material to be separated is introduced with the separating suspension under such a pressure that the required separation is obtained.

The coal fraction is discharged from the separator 4 through a conduit 5 and is supplied to a draining screen 6. Here the suspension oozes out of the coal mass and is collected in a reservoir 7. After that the coal passes over a washing screen 8 where the suspension still adhering to the coal particles is sprayed off by means of one or more of the sprayers 9, 10 and 11. The thus diluted suspension passing through the screen 8 is collected in a reservoir 12, whereas the washed coal is discharged at 13.

The shale fraction is discharged from the separator 4 through a conduit 14 and supplied to a draining screen 15. The suspension drained from the shale mass on the screen 15 is collected in a reservoir 16. Suspension still adhering to the shales is sprayed off on a washing screen 17 by means of one or more of the sprayers 18, 19 and 20. The diluted suspension passing through the screen 17 is collected in a reservoir 21, whereas the washed shales are discharged at 22.

The undiluted suspension collected in the reservoirs 7 and 16 may be reused without further treatment and is passed through the conduits 23 and 24 to a storage tank 25 from where it flows through a conduit 26 to a pump 27, which pumps it through a conduit 28 to the tank 1 or, in case of a float-and-sink separator, directly through a conduit 28′ to the separator 4. In the latter case it may be necessary that the suspension is demagnetized by a demagnetizing coil 28″ prior to entering the separator 4 to avoid clogging of the suspension particles in the separator 4.

The diluted suspension in the reservoirs 12 and 21 not only contains the magnetite particles but also those particles of the separated material which have a size smaller than the mesh of the screens 8 and 17. This diluted suspension flows through the conduits 29 and 30 to a conduit 31, which is connected to the inlet of a pump 32 by which the suspension is pumped through a conduit 33 to a classifier 34. In the classifier 34 the finer particles are separated from the coarser ones. This classifier may be of any conventional type but preferably a cyclone classifier is used so as to vertically classify the suspension, as in that case it is not necessary to demagnetize the magnetic particles in the suspension by means of a demagnetizing coil 33′ prior to entering the classifier.

It will be understood that the undiluted fraction obtained from the draining screens 6 and 15 and collected in the reservoirs 7 and 16 may also be fed to the classifier 34 in order to separate the non-magnetic particles therefrom, instead of feeding it to the separator 4. In this case the suspension in the reservoirs 7 and 16 flows through the conduits 23′ and 24′ to the conduit 31.

The bulk of the quickly settling particles, viz., the coarser coal and shale particles and a portion of the magnetite, in particular the coarsest magnetite particles, leave the classifier 34 through a conduit 35 and are supplied to a magnetic separator 36. Through a conduit 37 a small amount of clean water is added to the magnetic separator 36 between the belt and the magnet, in order to avoid wear of the belt and to prevent formation of a layer of magnetite particles on the magnet. The non-magnetic coarser coal and shale particles are collected in a reservoir 38, whereas the major part of the magnetite of the fraction fed into the magnetic separator 36 is dropped into the reservoir 39.

As the fraction collected in the reservoir 38 still may contain some magnetic particles this fraction is supplied through a conduit 40 to a second magnetic separator 41, clean water being supplied between the belt and the magnet through a conduit 42. The non-magnetic particles collected in a reservoir 43 are now substantially free from magnetite and led off through a conduit 44. The remaining particles are collected in a reservoir 45 and sent through a conduit 46 to the inlet of the pump 32 so that they are returned to the classifier 34 for retreatment.

The fraction collected in the reservoir 39 of the magnetic separator 36 is sent through a conduit 47 to a thickener 48, which preferably is of the gravitational type. Also the fine fraction of the classifier 34 preferably containing the major portion of the magnetite, in particular the finest magnetite particles, and the finest coal and shale particles are sent through a conduit 49 to the thickener 48. In order to promote a rapid settling of the magnetite particles in the thickener the fraction leaving the classifier 34 is passed through a magnetizing coil 50.

By means of a distributor 51 in the conduit 49 a part of the fine fraction leaving the classifier 34 may, if desired, be passed through a conduit 52 onto the sprayers 9 and 18. In this way the thickener will be relieved.

The thickened suspension from the thickener is fed through a conduit 53 to the storage tank 25. The required specific gravity of the suspension fed from the storage tank 25 to the separator 4 may for instance be adjusted by supplying a controlled quantity of clean water through a conduit 54 into the storage tank. The liquid introduced into the tank 25 through the conduits 23, 24, 53 and 54 is mixed by means of a stirrer 55.

The overflow fraction from the thickener 48 containing the fine coal and shale particles is partly supplied through a conduit 56 to the sprayers 10 and 19 and partly discharged through a conduit 57 in order to prevent said fine particles from accumulating in the liquid flow circuit. Moreover, part of the overflow may be passed via the distributor 58 and the conduit 59 onto the magnetic separator 36 by means of a pump 60 and a conduit 61 for the purpose of diluting the infeed of the coarse fraction discharged from the classifier 34 into the magnetic separator 36. As an alternative, which is not indicated in the figures, this coarse fraction may be diluted with part of the overflow from classifier 34.

The sprayers for spraying off the separated particles are so arranged that spraying is first performed with the overflow fraction from the classifier 34, i. e. with a dilute suspension of fine impurities and magnetite in water, subsequently with the overflow fraction from the thickener 48, i. e. with a dilute suspension of fine impurities in water, and finally with clean water, which is supplied through a conduit 62. This method has the advantage that the adhering suspension is sprayed off very thoroughly.

Losses of magnetite are compensated by supplying fresh magnetite to the system, for instance by introducing it into the thickener 48. The magnetite is reduced to the required particle size in a grinding system 63, consisting of a ball mill 64, a pump 65 and a classifier 66. Fresh magnetite is introduced into this system at 67 and clean water at 68. The classifier 66 is preferably so proportioned that the grain size of the fine fraction corresponds with the grain size of the fine fraction separated by the classifier 34. In this way the fraction which is passed by the classifier 34 to the magnetic separator 36 will contain a small portion only of the magnetic particles, so that consequently the magnetic separators are relieved and the amount of magnetite flowing off through conduit 44 is small. Preferably a hydrocyclone is used as classifier 66 in the grinding system 63, which hydrocyclone may have the same dimensions as the cyclone classifier 34. The fine fraction of the classifier 66 is sent through a conduit 69 to the conduit 49 leading to the thickener 48, whereas the coarser particles are returned through a conduit 70 to the ball mill 64.

In the accompanying flow-sheet the amounts of diluted suspension sprayed off from the fractions on the screens 8 and 17 are regenerated collectively. It will be understood, however, that the suspensions sprayed off from the coal and the shales respectively may be treated separately. In this case the through-puts of the screens 8 and 17 are treated in separate classifiers. The coarse fractions from said classifiers are then passed onto separate magnetic separators, whereas the light fractions are supplied to a common thickener. This arrangement has the advantage that those coarse non-magnetic particles which are smaller than the mesh of the rinsing screens 8 and 17 and which in the separator 4 have still satisfactorily been separated according to their specific gravity will be separately discharged from the magnetic separators as a fine coal and a fine shale fraction respectively.

In Figure 2 of the drawing a hydrocyclone is shown, which may be used as the separator at 4, the classifier at 34, as well as the classifier at 66. The hydrocyclone 100 comprises a cylindrical portion 101 and a conical portion 102. The cylindrical portion is closed by a cover plate 103, which is provided with a central base aperture 104. A feed pipe 105 for the material to be treated debouches tangentially into the cylindrical portion 101 through an inlet aperture 106. A conduit 107 protrudes centrally through the base aperture 104 into the cylindrical portion 101. The light fraction obtained in separation according to specific gravity or the fine fraction obtained in classification leaves the hydrocyclone through the conduit 107 and flows out in an open conduit 109 provided with enlarged inlet 108. The apex of the conical part 102 is provided with an aperture 110 through which the heavy fraction obtained in specific gravity separation or the coarse fraction obtained in classification leaves the hydrocyclone. This aperture is formed by an iris valve 111 of elastic material, such as rubber, so that the diameter of this aperture can be adjusted by regulating the pressure of the air supplied into the air chamber 112 through a conduit 113. In this way the desired separation can easily be adjusted by adjusting the diameter of the aperture 110. The heavy fraction flows out in an open conduit 115 provided with enlarged inlet 114.

EXAMPLE

Deslimed raw fine coal of 1–8 mm. is separated in a cyclone washer 4 into a clean coal fraction and a clean shale fraction with the help of a suspension of magnetite in water.

The cyclone washer 4 has the following dimensions:

Outer diameter 500 mm.
Inlet aperture 100 mm.
Base aperture 215 mm.
Apex aperture 100 mm. and variable between 60 and 150 mm.
Angle of conical part 20°.

The diameter of the apex aperture is made adjustable in order to adjust the required specific gravity of separation. The mixture is fed into the hydrocyclone 4 at an overpressure of 1.2 atm.

The separated fractions are drained at screens 6 and 15, which screens have a width of mesh of 1 mm. The separated fractions are further sprayed at screens 8 and 17 with overflow liquid from thickener 48 followed by spraying with clean water. The distributor 51 may be so adjusted that no liquid is supplied through the sprayers 9 and 18. The width of mesh of washing screens 8 and 17 also amounts to 1 mm. As the desliming of the raw fine coal is never complete and some particles will break during transport from the deslimer to the separator, the through-put of the screens 6, 8, 15 and 17 will contain fine coal and shale particles smaller than 1 mm.

The diluted suspension caught in the reservoirs 12 and 21 below the screens 8 and 17 is classified in a set of six hydrocyclones 34 having the following dimensions:

Outer diameter 350 mm.
Inlet aperture 70 mm.
Base aperture 150 mm.
Apex aperture 40 mm. and variable between 24 and 60 mm.
Angle at the conical part 20°.

The diameter of the apex apertures is made adjustable. The diluted suspension is fed into the hydrocyclones 34 at an overpressure of 0.6 atm.

The fine fraction of the cyclone classifiers 34 is fed into a thickener 48 having a diameter of 8.8 m., whereas the coarser fraction is treated in two magnetic separators 36 and 41 of the belt type.

The grinding system 63 is provided with a cyclone classifier 66 having the same dimensions and working under substantially the same pressure as the cyclones 34. The magnetite particles which are introduced through conduit 69 into the system have a size up to 60 mesh. The grinding system operates one hour in every 48 hours to replace the losses of magnetite in the circuit.

In continuous operation the following figures were obtained:

| | Water, m.³/h. | Magnetite, ton/h. | Non-magnetic particles, ton/h. |
|---|---|---|---|
| Tank 1: | | | |
| Introduced at 1 | 25 | | 76.5 |
| Introduced through 28 | 172 | 84 | 37 |
| Introduced through 54 | | | |
| Discharged through 3 | 197 | 84 | 113.5 |
| Draining screens 6 and 15: | | | |
| Supplied through 5 and 14 | 197 | 84 | 113.5 |
| Through-put to 25 | 162 | 73.3 | 33 |
| Overflow to 8 and 17 | 35 | 10.7 | 80.5 |
| Washing screens 8 and 17: | | | |
| Overflow screens 6 and 15 | 35 | 10.7 | 80.5 |
| Sprayers 10 and 19 | 401 | 0.01 | 29.5 |
| Sprayers 11 and 20 | 35 | | |
| Discharged at 13 | 15 | 0.02 | 50 |
| Discharged at 22 | 3 | 0.01 | 20 |
| Through-put at 12 and 21 | 453 | 10.77 | 40 |
| Tank 25: | | | |
| Introduced through 23 and 24 | 162 | 73.3 | 33 |
| Introduced through 53 | 10 | 10.7 | 4 |
| Discharged through 26 | 172 | 84 | 37 |
| Cyclone classifier 34: | | | |
| Introduced through 33 | 453 | 10.77 | 40 |
| Introduced through 46 | 6 | 0.095 | 0.95 |
| Discharged through 49 | 439 | 8.365 | 34.65 |
| Discharged through 35 | 20 | 2.5 | 6.3 |
| Magnetic separator 36: | | | |
| Introduced through 35 | 20 | 2.5 | 6.3 |
| Introduced through 37 | 1 | | |
| Introduced through 61 | 10 | 0.003 | 0.71 |
| Discharged through 40 | 25 | 0.103 | 5.61 |
| Discharged through 47 | 6 | 2.4 | 1.4 |
| Magnetic separator 41: | | | |
| Introduced through 40 | 25 | 0.103 | 5.61 |
| Introduced through 42 | 1 | | |
| Discharged through 44 | 20 | 0.008 | 4.66 |
| Discharged through 46 | 6 | 0.095 | 0.95 |
| Thickener 48: | | | |
| Introduced through 47 | 6 | 2.4 | 1.4 |
| Introduced through 49 | 439 | 8.365 | 34.65 |
| Introduced through 69 | 1 | 0.044 | |
| Discharged through 56 | 401 | 0.1 | 29.5 |
| Discharged through 57 | 25 | 0.006 | 1.84 |
| Discharged through 58 | 10 | 0.003 | 0.71 |
| Discharged through 53 | 10 | 10.7 | 4 |
| Grinding system 63: | | | |
| Introduced at 67 | | 0.044 | |
| Introduced at 68 | 1 | | |
| Discharged at 69 | 1 | 0.044 | |

In the figures for the grinding system it is assumed that this system operates continuously. Actually the grinding systems operate one hour in every 48 hours in which 48 m.³ water and 2.112 t. magnetite are supplied to the separating circuit.

From the above figures the following balance can be calculated for the complete system:

*Non-magnetic particles (coal and shale)*

| | Ton |
|---|---|
| Introduced at 1 | [1] 76.5 |
| Discharged clean coal 1–8 mm. at 13 | 50 |
| Discharged clean shale 1–8 mm. at 22 | 20 |
| Discharged fines 0–1 mm. at 44 | 4.66 |
| Discharged slimes at 57 | 1.84 |

[1] Ton raw material.

Magnetite

| | Kg. |
|---|---|
| Introduced at 67 | 44 |
| Discharged at 13 | 20 |
| Discharged at 22 | 10 |
| Discharged at 44 | 8 |
| Discharged at 57 | 6 |

Water

| | m.³ |
|---|---|
| Introduced at 1 | 25 |
| Introduced at 37 | 1 |
| Introduced at 42 | 1 |
| Introduced at 62 | 35 |
| Introduced at 68 | 1 |
| Discharged at 13 | 15 |
| Discharged at 22 | 3 |
| Discharged at 44 | 20 |
| Discharged at 57 | 25 |

From the above figures it follows that only a small magnetic separator 36 having a capacity of 2.5 ton/hour is sufficient to treat the diluted suspension from the screens 8 and 17. Without using the classifier 34 a magnetic separator with a capacity of 10.865 ton/hour would be required. The losses of magnetite will therefore in the present case be correspondingly smaller, also because the bulk of the fine magnetite particles which are the most difficult to recover, by-pass the magnetic separator.

Figure 3 illustrates a variation of Figure 1, adapted for separation of raw coal into three products by means of two washing tanks arranged in series, and like numerals are employed therein to indicate like elements. According to Figure 3 raw coal larger than for instance 10 mm., is fed at 1 to a washing tank 201 which contains a suspension of fine magnetite in water. The specific gravity of this suspension is such that coal floats thereon and shale, which has a higher specific gravity than coal, sinks. This is the reason that this kind of separation is known as the sink-and-float process. Washing tank 201 may be of the type described in United States Patent No. 2,619,229, which is shallow and is provided with a conventional device, such as an endless scraper, which removes the separated particles from the suspension, feeding the sink product, that is the shale fraction, to a washing screen 17, and the float product to a second washing tank 202, which may be of the same type as washing tank 201. Washing tank 202 contains a suspension of fine magnetite in water, the suspension in washing tank 202 having a lower specific gravity than the suspension in washing tank 201. In washing tank 202 the coal particles are separated from particles consisting of considerable quantities of both coal and shale, so called mixed particles which particles have a higher specific gravity and a higher ash content than the coal particles but a lower specific gravity and a lower ash content than the shale particles. The coal, which floats, is discharged on a washing screen 8, the mixed which settles is discharged on a washing screen 203. Washing tank 201 is provided with an overflow 204 and the suspension in washing tank 201 can not rise substantially above the level thereof. Likewise, washing tank 202 is provided with an overflow 205. As in Figure 1, there are sprayers above the washing screens and reservoirs underneath, all indicated with like numerals. Above screen 203 there are sprayers 206 for spraying with clarified liquid from thickener 48 and sprayers 207 for spraying with water. The diluted suspension passing through screen 203 is received in a reservoir 208. The cleaned shale is discharged at 22, the cleaned coal at 13 and the cleaned mixed at 209.

The undersize from screens 8, 17 and 203 consists of a diluted suspension of magnetite in water, which suspension contains some fine particles which may have been present in the raw coal or which will have formed due to breakage of larger particles in the washing tank or during transport. Furthermore, one of the screens 8, 17 and 203 may sometimes be torn so that also coarser particles can find their way into the diluted suspension collected under the screens. To prevent coarser particles from entering the cleaning circuit the undersize from screens 8, 17 and 203 is fed, together with the overflow suspension from washing tanks 201 and 202, to a screen 210, which may be of a finer mesh than are screens 8, 17 and 203. These screens may for instance have apertures which are 2 mm. wide, whereas screen 210 may for instance have 1 mm. apertures. The oversize from screen 210 is removed at 211; this fraction may be further treated in another plant, for instance in the plant in which the fine coal (smaller than 10 mm.) is washed. The undersize from screen 210 is fed through a conduit 212 to a diluted-suspension-vessel 213, from where it is fed through conduit 31 to pump 32, which pumps it through conduit 33 to cyclone classifier 34, in which it is vertically classified. As described with reference to Figure 1, the major portion of the magnetic particles and of the slimes exits through the overflow from hydrocyclone 34 and are fed through conduit 49, which passes through a magnetizing coil 50, to the gravitational thickener 48. (It should be pointed out that a hydrocyclone can operate in any position, so that the terms "overflow" and "underflow" do not refer to the level from which the fractions are discharged, but to the character of the discharged fractions in analogy to fractions from other apparatus. The underflow from a hydrocyclone is often called the "apex fraction," the overflow is sometimes called the "vortex-finder fraction.") The underflow from hydrocyclone 34 is fed through conduit 35 to magnetic separator 36. The magnetic particles are collected in reservoir 39 and are led through conduits 47 and 49 to thickener 48. The non-magnetic particles are collected in reservoir 38, which is provided with a discharge conduit 40 and with an overflow conduit 214, which lead to magnetic separator 41. The task of magnetic separator 41 is to recover magnetite which has not been recovered by magnetic separator 36. If magnetic separator 36 is very efficient magnetic separator 41 can be omitted. The magnetics from magnetic separator 41 are collected in reservoir 45 and are led through conduits 215 and 49 to thickener 48. The non-magnetic particles from magnetic separator 41 are collected in reservoir 43, which is provided with a discharge conduit 44 and an overflow conduit 216, which lead to a vessel 217, in which the non-magnetics are collected. Suspension received therein is pumped by a pump 218 through a conduit 219 to a thickener 220, which, according to Figure 3 is a cyclone thickener, but which may be of another type. The thickener 220 concentrates most solids in the underflow, most liquid, slimes and very fine particles exiting through the overflow. The underflow from thickener 220 is fed through a conduit 221 to a pivoting funnel 222 which can be set in two positions, either discharging into a compartment 223 of a receiver 224 or to a compartment 225 thereof. Suspension received in compartment 223 is removed from the circuit through a conduit 226, suspension received in compartment 225 is fed through a conduit 227 to a reservoir 228, which is at the lowest level in the washing plant. All liquid and suspension L which is spilled in the washing plant finally gets into this reservoir 228 and is pumped by a pump 229 through a conduit 230 to diluted-suspension-vessel 213. Pump 229 may be operated intermittently. The overflow from thickener 220 flows through a conduit 231 to a distributor 232 which directs a portion of the overflow through a conduit 233 to diluted-suspension-vessel 213 and the balance through a conduit 234 to pivoting funnel 222. The quantity of liquid led from distributor 232 to diluted-suspension-vessel 213 is controlled so as to keep the level of the liquid in diluted-suspension-vessel 213 substantially constant. A portion of fine magnetite which has found its way into the fraction of non-magnetics is thus kept in the circuit.

As shown in Figure 4 pivoting funnel 222 is electrically connected to magnetic separator 41. Magnetic separator 41 is connected via a switch 301 to a source of alternating current 302 and via a switch 303 to a source of direct current 304. The alternating current serves for moving a belt 305 of magnetic separator 41, whereas the direct current excites the magnets 306 thereof. The position of pivoting funnel 222 is controlled by a brake-lifting-magnet 307, which is connected by a chain 308 with a bar 309, which bar is fixed to pivoting funnel 222. If brake-lifting-magnet 307 is not excited, the outlet of pivoting funnel 222 is above compartment 225 of receiver 224, as shown in Figure 4. If brake-lifting-magnet 307 is excited pivoting funnel 222 is turned around its axis 310 until its outlet is above compartment 223. The brake-lifting-magnet 307 receives its current from switch 301 via a switch 311, which is adapted to close the circuit when coil 312 is energized, coil 312 receiving its current from switch 303. Consequently, in normal operation of magnetic separator 41 the outlet of pivoting funnel 222 is above compartment 223 and the suspension fed to pivoting funnel 222 is withdrawn from the circuit via conduit 226. However, if, due to a power failure of the alternating current or of the direct current or of both, magnetic separator 41 stops operating properly, the pivoting funnel turns and discharges into compartment 225, thus keeping the suspension in the circuit. Consequently, during the initial period of a power failure loss of magnetite is prevented. It will be clear that nevertheless the operation must be stopped to prevent accumulation of contaminated water in the circuit. Consequently it may be advisable also to provide a clear signal which gives a warning in case of power failure.

If there are two magnetic separators 36 and 41, as in Figure 3, it is possible to provide a further switch which, in the same manner as switch 311, interrupts the current to the brake-lifting-magnet 307 whenever the direct current or the alternating current to magnetic separator 36 fails.

Returning now to Figure 3, the thickened fraction from thickener 48 is pumped by a pump 235 through a conduit 53 to a distributor 236, from where a portion of the thickened suspension is led through a conduit 237 to washing tank 201. Another portion may be led from distributor 236 through a conduit 238 to washing tank 202, but in general this is not necessary. Demagnetization of the magnetite in the suspension is not necessary if washing tanks of the type referred to are employed. The quantity of suspension fed to distributor 236 is made so large that under all circumstances a sufficient amount of thickened suspension can be fed to the washing tanks. Accordingly, the quantity of thickened suspension fed to distributor 236 is larger than the average quantity fed to the washing tanks. The excess flows back to thickener 48 via conduits 239 and 49.

The specific gravity of the thickened suspension from thickener 48 generally is higher than the specific gravity of the suspension in washing tank 201, which again is higher than the specific gravity of the suspension in washing tank 202. To maintain the proper specific gravity in these washing tanks liquid with a low specific gravity must be supplied thereinto. According to Figure 3 overflow liquid A from thickener 48 is fed by a pump 240 through conduits 241 to the washing tanks 201 and 202. Another portion of the overflow from thickener 48 is fed to sprayers 10, 19 and 206 above the washing screens. The balance of the overflow from thickener 48 is removed from the circuit through conduit 57; this liquid contains slimes which thus are removed from the circuit.

To maintain the proper specific gravities of the suspensions in the washing tanks 201 and 202 and to prevent the level of the suspension in washing tank 201 from becoming too low, the quantities of thickened suspension and clarified liquid A fed to the washing tanks should be accurately controlled. The way in which this can be done has been described in detail in U. S. patent application Serial No. 413,562, now Patent No. 2,754,963. That application also describes how the suspensions are stored during a shut-down of the plant.

Losses of magnetite are made up by supplying coarse magnetite particles through a conduit 242 to ball mill 64, water or clarified liquid from a classifier of thickener being supplied through a conduit 243 to the ball mill. The ground magnetite is passed through a coarse screen 244 to prevent balls from the ball mill to come into pump 65. The ground magnetite passes through screen 244 to a reservoir 245 and is pumped by pump 65 through a conduit 246 to cyclone classifier 66. The underflow from classifier 66 contains magnetite particles which are too coarse and is returned through conduit 70 to ball mill 64. The overflow from classifier 66 is led through a conduit 247 to a distributor 248, which divides the fine magnetite suspension between a conduit 69 leading to magnetizing coil 50 and thickener 48 and a conduit 249 leading to reservoir 245. The quantity of suspension led from distributor 248 to thickener 48 is so adjusted that the magnetite losses occurring in the process are substantially made up. Ball mill 64 and classifier 66 generally have a larger capacity than necessary for this purpose, so that part of the fine magnetite is kept in the grinding circuit. Consequently reservoir 245 acts as a store tank for fresh magnetite suspension. An advantage of this system over the system explained with reference to Figure 1 is, that the thickener 48 is more evenly charged so that it can be smaller; furthermore the quantities of magnetite and water in the circuit remain substantially constant.

For starting operation of thickener 48 after a shut-down, a conduit 250 is provided through which a stream of water can be introduced into the thickener in the region of the outlet for thickened suspension. After adding some water therethrough it is possible to withdraw thickened suspension through this outlet, which otherwise might be clogged.

By way of example some figures are given hereafter for a plant according to Figure 3 for treating 100 metric tons per hour of raw coal substantially between ⅜" and 4".

Washing tanks 201 and 202 are 6'6" wide; the suspension in washing tank 201 has a specific gravity of 2.0, the suspension in washing tank 202 having a specific gravity of 1.5. The magnetite in the separating suspension is for 95% finer than 300 mesh. The capacity of ball mill 64 is 0.2 metric tons per hour. All screens are 10' long and 5' wide; the magnetic separators are 2' wide. Thickener 48 has a diameter of 18'. The content of diluted-suspension-vessel 213 and of reservoir 228 is 2500 gallons, the content of reservoir 245 is 800 gallons. The capacity of pumps 32 and 240 is 600 gallons per minute, the capacity of pump 229 is 250 gallons per minute, the capacity of pump 65 is 65 gallons per minute and the capacity of pump 235 is 100 gallons per minute. The quantity of fresh water supplied to the process amounts to approximately 90 gallons per minute.

The dimensions and operating conditions of the hydrocyclones are as follows:

| reference number | 34 | 66 | 220 |
|---|---|---|---|
| number of hydrocyclones | 2 | 1 | 1 |
| diameter of cylindrical portion (mm.) | 350 | 150 | 350 |
| diameter inlet aperture (mm.) | 70 | 30 | 70 |
| diameter base aperture (mm.) | 150 | 65 | 150 |
| diameter apex aperture variable between (mm.) | 80–100 | 20–30 | 40 (non-variable) |
| angle at the conical portion, degrees | 20 | 60 | 20 |
| feed pressure (kg. per square centimeter) | 0.5 | 0.5 | 0.5 |

Figure 5 illustrates a variation of Figure 1, adapted for separation into two fractions by means of a hydrocyclone which is arranged in a manner as described in U. S. patent application Serial No. 360,464, and like numerals as in Figures 1 and 3 are employed in Figure 5 to indicate like elements. Figure 5 will be explained with reference to separation of coal, but the same system can be employed for separating ores and other mixtures of solid particles.

According to Figure 5 raw fine coal 401 is fed to a desliming screen 402 which may for instance have 30 mesh apertures. The raw coal is sprayed with water or clarified liquid by means of sprayers 403. The slimes are received in a reservoir 404 and removed from the circuit through a conduit 405. These slimes may be further treated in another plant if desired. The oversize 1 from screen 402 is led to a feeding device 406, which will be described hereinafter in more detail. In feeding device 406 the deslimed raw coal is mixed with separating suspension supplied from storage tank 25 via conduit 26, pump 27 and conduit 28. From the feeding device 406 the suspended raw coal is fed via a conduit 3 to a cyclone washer 407, the axis of which makes a small angle, for instance 10°, with the horizontal plane. As explained in U. S. patent application Serial No. 360,464 a cyclone washer which is so placed can be operated at a low feed pressure; as shown in Figure 5 the height of feeding device 406 above hydrocyclone 407, which may for instance be 13', is sufficient to operate hydrocyclone 407 without use being made of a pump. However, if this arrangement is employed special measures must be taken. It is namely necessary that coal particles are prevented from floating in the feeding device, since this would lead to irregular feeding of the cyclone or even to clogging of the feeding device. Furthermore, a substantially constant level of the suspension should be maintained in the feeding device so as to have a constant feed pressure for the cyclone. To maintain a constant level the feeding device can be provided with an overflow, but then it is necessary to prevent overflow of coal particles or other particles to be separated. Figure 6 shows how these problems have been solved.

According to Figure 6 the feeding device comprises a vessel 501 which is provided with a feed conduit 502, and overflow conduit 503 and in the bottom, a discharge aperture 504. Discharge aperture 504 opens into a vessel 505, the upper rim of which is at a higher level than the overflow conduit 503 of vessel 501. Vessel 505 is provided with a feed conduit 506 and is at the bottom connected to closed conduit 3 which leads to cyclone washer 407. At the top of the feeding device there are means for feeding the mixture 1 to be separated to feed conduit 506 and for feeding suspension to both feed conduits 502 and 506. To this end, according to Figure 6, feed conduits 502 and 506 both consist of a chute, a perforated pipe 507 which is connected via a flexible tube 508 to conduit 28 being provided above these chutes. This arrangement provides the possibility to divide the suspension supplied through conduit 28 in any desired proportion over the two feed conduits 502 and 506.

In operation the mixture 1 to be separated is fed to feed conduit 506 and is transported by suspension from pipe 507 to vessel 505. The quantity of suspension so supplied to vessel 505 is smaller than the quantity which can be handled by cyclone 407. Suspension from pipe 507 is also fed to feed conduit 502. The total amount of mixture and suspension fed to feed conduits 502 and 506 is made larger than the quantity which can be handled by hydrocyclone 407. Consequently part of the suspension fed to vessel 501 is discharged through overflow conduit 503, another portion through discharge aperture 504. The quantity of suspension which is fed from vessel 501 to vessel 505 through aperture 504 is so selected in relation to the size of aperture 504, that the velocity of suspension through aperture 504 prevents particles in vessel 505 from entering vessel 501 through aperture 504. In other words the velocity of suspension through aperture 504 should be significantly greater than the rising velocity in the suspension of the particles with the lowest specific gravity, or, if aperture 504 is arranged so that the suspension flows in an upward direction from vessel 501 to vessel 505, significantly larger than the settling velocity of the particles with the highest specific gravity. The diameter of aperture 504 must be so large on the other hand that a sufficient amount of suspension can be fed therethrough to vessel 505, because the total amount of material and suspension fed to vessel 505 must be same as the amount which can be handled in the cyclone washer 407. Furthermore, the cross sectional area of vessel 505 and of conduit 3 should be so small in relation to the quantity of material transported therethrough, that the downward velocity of the suspension is significantly larger than the rising velocity in the suspension of the particles with the lowest specific gravity. In other words by properly dividing the suspension supplied through conduit 28 over the feed conduits 506 and 502 and by properly selecting the diameter of aperture 504, separation of the mixture in the feeding device 406 is prevented, the level of the suspension in the device is kept constant, namely at the level of the overflow conduit 503 and no particles of the mixture can reach the overflow conduit 503. Proper dimensions of the feeding device 406 and the proportion in which the suspension should be divided over feed conduits 502 and 506 can easily be calculated or be found by trial and error. Generally the downward velocity of the suspension in vessel 505 should be at least 20 cm. per second and in aperture 504 a velocity of 100 cm. per second generally is safe.

Returning now to Figure 5 it is seen that the overflow suspension from feeding device 406 is returned through conduit 503 to storage tank 25. The separated fractions from hydrocyclone 407 are each fed to a set of screens, but only the screens receiving the overflow fraction from cyclone 407 are shown in the drawing. The overflow fraction from cyclone 407 is led through conduit 5 to draining screen 6, the undersize therefrom being received in storage tank 25, the oversize being passed on to washing screen 8 where the coal is sprayed first by means of sprayers 10 with clarified liquid and then by means of sprayers 11 with clean water. The undersize from screen 8 is received in a reservoir 408, the oversize, clean coal, is discharged at 13. The screens receiving the shale fraction from cyclone washer 407 through conduit 14 are also arranged above tank 25 and reservoir 408, the clean shale being discharged at 22. The diluted suspension from reservoir 408 is led through a conduit 409 to diluted-suspension-vessel 213 and is further treated in cyclone classifier 34, magnetic separators 36 and 41 and thickener 48 in the same manner as explained with reference to Figure 3. The fraction of non-magnetics from magnetic separator 41 is fed through conduit 44 to a settling tank 410 which has substantially the same function as cyclone thickener 220 in Figure 3, a difference being that more magnetite particles will exit from the overflow of a hydrocyclone than in the overflow of a settling tank, due to mutual attraction which is effective in a settling tank. If desired settling tank 410 may be replaced by another type of thickener or by a classifier. The underflow fraction from settling tank 410 in which the non-magnetic particles are concentrated, is passed to pivoting funnel 222 which may be controlled automatically in the same manner as described with reference to Figures 3 and 4. The overflow from the setling tank 410 is fed to distributor 232 and divided between conduit 233 and conduit 234 in such manner that the level of the suspension in diluted-suspension-vessel 213 remains substantially constant. Reservoir 228 is at the lowest level in the washing plant (this fact is not clear in the drawing), so as to receive all spilled liquid and suspension L.

Overflow liquid from thickener 48 is fed by pumps 240 through conduit 241 to the sprayers 10 and similar sprayers (not shown in Figure 5) for spraying the shale fraction. The balance of the overflow is removed from the process through conduit 57, although a portion thereof may be fed to ball mill 64 or to other places where some liquid is wanted. The circuit of ball mill 64 corresponds with the ball mill circuit described with reference to Figure 3 and requires no further explanation.

The specific gravity of the suspension in storage tank 25 is controlled by controlling the quantity of underflow from thickener 48 fed to the storage tank. This quantity may be controlled automatically in the same manner as described in U. S. patent application Serial No. 413,562. The excess of thickened suspension supplied through conduit 53 is returned to thickener 48 via distributor 236 and conduit 239.

The mixture to be separated is wet due to the fact that it has been sprayed with water in screen 402. Consequently water is introduced continuously into the suspension circulating between storage tank 25, feeding device 406 and cyclone washer 407. The thickened suspension from thickener 48 therefore must have a higher specific gravity than is required for the separation in cyclone 407. By controlling the quantity of thickened suspension led from distributor 236 to storage tank 25 the specific gravity of the suspension in the storage tank can be maintained at the desired height. Due to the fact that liquid is continuously introduced into the circuit of the separating suspension, the level of the suspension in storage tank 25 tends to rise. Consequently a certain amount of suspension must be withdrawn from this circuit. To this end storage tank 25 is provided with an overflow conduit 411 through which suspension is continuously withdrawn from storage tank 25 and is led to diluted-suspension-vessel 213. When the plant is shut-down a valve 412 in conduit 411 is closed, and all suspension present in feeding device 406, hydrocyclone 407 and the conduits in between is then collected in storage tank 25. At a level above overflow conduit 411 another overflow conduit 413 is provided, which also leads to diluted-suspension-vessel 213 and prevents the level of the suspension in storage tank 25 to become too high. At the bottom of storage tank 25 compressed air can be admitted through a conduit 414 to prevent settling of the suspension in the storage tank, in particular during a shut-down.

By way of example some figures are given below for a plant according to Figure 5 for treating 100 metric tons per hour of raw coal finer than ⅜" and 70% larger than 30 mesh.

All screens are 5' broad and 10' long and have slotted apertures which are 0.59 mm. wide. Screens 402, 6 and 8 each comprise two of such screens, the shale fraction is treated on a single draining screen and on a single washing screen (not shown in Figure 5). The magnetic separators 36 and 41 are 3' wide. The content of diluted-suspension-vessel 213 and of reservoir 228 is 2500 gallons, the content of storage tank 25 is 6500 gallons, the content of reservoir 245 is 800 gallons. The diameter of thickener 48 is 24', the diameter of settling tank 410 is 7'. Pumps 27 and 32 have capacities of 1100 gallons per minute, pumps 229 and 235 have capacities of 250 gallons per minute and the capacity of pump 65 is 65 gallons per minute. The magnetite in the separating suspension is for 95% finer than 300 mesh. The specific gravity of the thickened suspension from thickener 48 is 2.2, the specific gravity of the suspension in storage tank 25 is 1.6. Ball mill 64 has a capacity of 0.2 metric ton of magnetite per hour. The largest cross sectional area of vessel 505 is 48 x 48 cm.², aperture 504 is circular and has a diameter of 10 cm. The perforated pipe 507 is so arranged as to feed 22% of the suspension to vessel 501 and 78% to vessel 505.

The dimensions and operating conditions of the hydrocyclones are as follows:

| | | | |
|---|---|---|---|
| reference number | 407 | 34 | 66 |
| number of hydrocyclones | 2 | 4 | 1 |
| diameter of cylindrical portion (mm.) | 500 | 350 | 350 |
| diameter inlet aperture (mm.) | 100 | 70 | 70 |
| diameter base aperture (mm.) | 215 | 150 | 150 |
| diameter apex aperture | 150 | 80–100 (variable) | 40 |
| angle at the conical portion, degrees | 20 | 20 | 20 |
| feed pressure (kg. per square centimeter) | 0.6 | 0.5 | 0.5 |
| inclination of axis, degrees | 10 | 90 | 90 |

Having described my invention, what I intend to claim as new is:

1. A process of reconditioning a diluted suspension of fine magnetic particles and contaminating solid particles in a liquid which comprises the steps of separating said suspension while said magnetic particles are in finely divided state into at least two fractions, the first of which includes the bulk of the liquid and the bulk of the slowly settling particles, including the bulk of the magnetic particles, the second of which includes a small portion of the liquid, a correspondingly small portion of the slowly settling particles and the bulk of the quickly settling particles, thickening at least the bulk of said first fraction without prior magnetic separation, and magnetically separating magnetic particles from said second fraction.

2. A process as defined in claim 1, wherein a suspension of the magnetic particles separated from said second fraction is thickened together with said portion of said first fraction.

3. A process as defined in claim 1, wherein the magnetic particles in said first fraction are magnetized prior to thickening.

4. A process as defined in claim 1, wherein the classification is effected in a hydrocyclone.

5. A process as defined in claim 1, wherein the magnetic particles in the diluted suspension are in magnetized condition when classified.

6. A continuous separation process comprising the steps of separating a heterogeneous mixture of solid particles into fractions with the aid of a suspension of fine magnetic particles in liquid, spraying the fractions so separated on washing screens, classifying the undersize from the washing screens while said magnetic particles are in finely divided state into at least two fractions, the first of which includes the bulk of the liquid and the bulk of the slowly settling particles, including the bulk of the magnetic particles, the second of which includes a small portion of the liquid, a correspondingly small portion of the slowly settling particles and the bulk of the quickly settling particles, thickening at least the bulk of said first fraction without prior magnetic separation, recycling the concentrated fraction from the thickening operation to said separation process, magnetically separating magnetic particles from said second fraction, and utilizing clarified liquid from the thickening operation in spraying the separated fractions on said washing screens.

7. A process as defined in claim 6, wherein a suspension of the magnetic particles separated from said second fraction is thickened together with said portion of said first fraction.

8. A process as defined in claim 6, wherein the magnetic particles in said first fraction are magnetized prior to thickening.

9. A process as defined in claim 6, wherein a portion of said first fraction is utilized in spraying at least one of the separated fractions on said washing screens.

10. A process as defined in claim 6, wherein a portion of the clarified liquid from the thickening operation is mixed with said second fraction.

11. A process as defined in claim 6, wherein a portion of the clarified liquid from the thickening operation is withdrawn from the circuit.

12. A process as defined in claim 6, wherein the classification is effected in a hydrocyclone.

13. A process as defined in claim 6, wherein the magnetic particles in the diluted suspension are in magnetized condition when classified.

14. A process as defined in claim 6, including the steps of grinding coarse magnetic particles, classifying the ground magnetic particles under substantially the same conditions as used in the classification of the undersize of said washing screens, and introducing at least part of the fine fraction of said fresh magnetic particles into the process to make up losses.

15. A continuous separation process comprising the steps of mixing a heterogeneous mixture of solid particles with a suspension of fine magnetic particles in liquid; feeding the suspension mixture at a substantially constant pressure into a cyclone washer; separating the mixture in the cyclone washer into fractions according to specific gravity; screening said fractions on draining screens and receiving the undersize in a storage tank; spraying the oversize from said draining screens on washing screens with overflow liquid from a thickening operation and then with water; receiving the undersize from said washing screens in a diluted-suspension-vessel; vortically classifying material received in said diluted-suspension-vessel into an overflow fraction and an apex fraction, said overflow fraction including the bulk of the liquid and the bulk of the slowly settling particles, including the bulk of the magnetic particles, said apex fraction including a small portion of the liquid, a correspondingly small portion of the slowly settling particles and the bulk of the quickly settling particles; magnetically separating magnetic particles from said apex fraction; thickening at least the bulk of said overflow fraction from said vortically classifying operation together with a suspension of the magnetic particles separated magnetically from said apex fraction; removing a portion of the overflow liquid from said thickening operation from the circuit; feeding thickened suspension from said thickening operation to said storage tank at a rate so as to maintain the specific gravity of the suspension therein such as required for the separation in said cyclone washer; and removing suspension from said storage tank and mixing further particles to be separated therewith.

16. A process as defined in claim 15, wherein a fraction of non-magnetic particles separated magnetically from said apex fraction is thickened, the underflow from this thickening operation being removed from the circuit, at least a portion of the overflow fraction from this thickening operation being fed to said diluted-suspension-vessel at a rate so as to maintain the level of the suspension therein substantially constant.

17. A process as defined in claim 15, wherein the level of the suspension in said storage tank is kept substantially constant by continuously overflowing suspension therefrom and receiving such overflow suspension in said diluted-suspension-vessel.

18. Continuous process of washing coal comprising the steps of separating raw coal into coal and shale fractions by means of a separating suspension of fine magnetic particles in water; spraying each of said separated fractions on washing screens first with clarified overflow liquid from a thickening operation and then with water; receiving undersize from said washing screens in a diluted-suspension-vessel; vortically classifying material received in said diluted-suspension-vessel into an overflow fraction and an apex fraction, said overflow fraction including the bulk of the liquid and the bulk of the slowly settling particles, including the bulk of the magnetic particles, said apex fraction including a small portion of the liquid, a correspondingly small portion of the slowly settling particles and the bulk of the quickly settling particles; magnetically separating magnetic particles from said apex fraction; thickening at least the bulk of said overflow fraction from said vortically classifying operation together with a suspension of the magnetic particles separated magnetically from said apex fraction; removing a portion of the overflow liquid from said thickening operation from the circuit; and feeding thickened suspension from said thickening operation to said separating operation.

19. A process as defined in claim 18, wherein thickened suspension and overflow from said thickening operation are fed to said separating operation at such rates as to maintain both the specific gravity and the quantity of the separating suspension employed therein substantially constant.

20. A process as defined in claim 18, wherein a fraction of non-magnetic particles separated magnetically from said apex fraction is thickened, the underflow from this thickening operation being removed from the circuit, at least a portion of the overflow fraction from this thickening operation being fed to said diluted-suspension-vessel at a rate so as to maintain the level of the suspension therein substantially constant.

21. A process as defined in claim 18, wherein said undersize from said washing screens is finely screened before being subjected to vortical classification.

22. In an apparatus for reconditioning a diluted suspension of fine magnetic particles and contaminating solid particles in a liquid, a cyclone classifier, means for feeding diluted suspension thereto, a magnetic separator, means for feeding underflow from said cyclone classifier to said magnetic separator, a thickener, and means for feeding overflow from said cyclone classifier and a fraction of magnetic particles from said magnetic separator to said thickener.

23. Apparatus for continuously separating a heterogeneous mixture of solid particles in a suspension of fine magnetic particles in a liquid which comprises a feeding device for feeding a suspension to a cyclone washer, means for separately discharging separated fractions from said cyclone washer, draining screens for receiving each of said fractions, a storage tank for receiving undersize from said draining screens, means for feeding suspension from said storage tank to said feeding device, washing screens for receiving oversize from said draining screens, means for spraying material on said washing screens first with clarified liquid and then with water, a diluted-suspension-vessel for receiving undersize from said washing screens, a cyclone classifier, means for feeding suspension from said diluted-suspension-vessel to aid cyclone classifier, a magnetic separator, means for feeding underflow from said cyclone-classifier to said magnetic separator, a thickener, means for feeding overflow from said cyclone classifier and a fraction of magnetic particles from said magnetic separator to said thickener, means for feeding a controlled quantity of underflow from said thickener to said storage tank, and means for feeding overflow from said thickener to said spray means.

24. Apparatus for continuously washing coal by means of a suspension of fine magnetic particles in water, which comprises a washing tank, means for separately discharging sink-and-float fractions from said washing tank, washing screens for receiving each of said fractions, means for spraying material on said washing screens first with clarified liquid and then with water, a diluted-suspension-vessel for receiving undersize from said washing screens, a cyclone-classifier, means for feeding suspension from said diluted-suspension-vessel to said cyclone classifier, a magnetic separator, means for feeding underflow from said cyclone classifier to said magnetic separator, a thickener, means for feeding overflow from said cyclone classifier and a fraction of magnetic particles from said magnetic separator to said thickener, means for feeding a controlled quantity of underflow from said thickener to said washing tank, and means for feeding overflow from said thickener to said spray means.

25. A continuous method of mixing a heterogeneous mixture of particles to be separated with a liquid separating medium and feeding the mixture to a separating device at a substantially constant pressure and rate, which comprises establishing a stream of separating medium which flows at a rate which is significantly in excess of the rate at which separating medium is supplied to the separating device; dividing said stream into a first and a second stream, said first stream flowing at a rate which is significantly below the rate at which the separating medium is supplied to the separating device; feeding said first stream and the mixture to be separated to a first vessel; feeding said second stream to a second vessel; feeding separating medium from said second vessel to said first vessel at a rate which equals the rate at which suspension is fed to said separating device minus the rate at which mixture to be separated and said first stream are supplied to said first vessel; causing the balance of said second stream to overflow from said second vessel; feeding all material received in said first vessel downwardly through a closed conduit to said separating device; and maintaining the velocity of the stream from said second vessel into said first vessel and the velocity of the flow of material through said first vessel and said closed conduit significantly in excess of the rising velocity of the particles having the lowest specific gravity in said separating medium.

26. Feeding device which comprises a first and a second vessel, means for feeding a liquid separating medium and mixture to be separated to said first vessel, and means for feeding liquid separating medium to said second vessel, said second vessel being provided with a discharge aperture opening into said first vessel and with an overflow conduit, the upper rim of said first vessel being at a higher level than said overflow conduit, and said first vessel being connected to a downwardly extending closed conduit.

27. Apparatus as defined in claim 23, wherein the feeding device includes a first and a second vessel, means for feeding a liquid separating medium and a mixture to be separated to said first vessel, and means for feeding liquid separating medium to said second vessel, said second vessel being provided with a discharge aperture opening into said first vessel and with an overflow conduit, the upper rim of said first vessel being at a higher level than said overflow conduit, and said first vessel being connected to a downwardly extending closed conduit.

References Cited in the file of this patent
UNITED STATES PATENTS 2,113,609    Wuensch _____ Apr. 12, 1938

OTHER REFERENCES

Mining Engineering, February 1951, Transactions AIME, vol. 190, pages 153–165.

Mining Congress Journal, June 1947, pages 36–39, Fig. 2 on page 37, relied on.

(Copies available in Scientific Library.)